United States Patent [19]

Schulz

[11] Patent Number: 5,192,491

[45] Date of Patent: Mar. 9, 1993

[54] APPARATUS FOR THE NEUTRON-RADIOGRAPHY TESTING OF A BOILING WATER REACTOR CONTROL ELEMENT

[75] Inventor: Wolfgang Schulz, Wunstorf, Fed. Rep. of Germany

[73] Assignee: ABB Reaktor GmbH, Mannheim, Fed. Rep. of Germany

[21] Appl. No.: 850,865

[22] Filed: Mar. 13, 1992

[30] Foreign Application Priority Data

Mar. 15, 1991 [DE] Fed. Rep. of Germany ....... 4108438

[51] Int. Cl.$^5$ .......................... G21C 17/00; G01T 3/00; G01N 23/00
[52] U.S. Cl. ................................. 376/159; 250/390.02
[58] Field of Search ............................. 376/159, 157; 250/390.02

[56] References Cited

FOREIGN PATENT DOCUMENTS 1223586 10/1986 Japan .................................. 376/257

OTHER PUBLICATIONS

Product Engineering, Jul. 1971, vol. 42, pp. 38-39.
Mater. Res. AECL (Canada) (Oct. 1971), pp. 18-22.

Primary Examiner—Harvey E. Behrend

[57] ABSTRACT

A boiling water reactor has a control element disposed in a water pond. An apparatus for the neutron-radiography testing of the control element includes a film cassette having a recording area. A water-free hood is fitted over the control element. The hood has an open bottom and a wall facing the film cassette. The wall has an opening formed therein with a cross section corresponding to the recording area. A holding device fits over the opening for receiving the film cassette. The holding device has a downwardly open side extended below the opening through which the film cassette is to be introduced into the water-free space in the holding device. A neutron source, a collimator and the film cassette lie in one measurement plane. The opening in the hood wall reduces the proportion of scattered neutrons and the impairment of image quality caused by a film of water remaining between the hood wall and the film cassette and by the hood wall itself, in prior art devices in which the film cassette is disposed outside the hood.

4 Claims, 2 Drawing Sheets

APPARATUS FOR THE NEUTRON-RADIOGRAPHY TESTING OF A BOILING WATER REACTOR CONTROL ELEMENT

The invention relates to an apparatus for the neutron-radiography testing of a boiling water reactor control element disposed in a water pond, including a hood which has an open bottom, which fits over the control element and which is kept free of water, a neutron source, a collimator and a film cassette which lie in one measurement plane.

In generally known apparatuses of this type, the film cassette is disposed outside the hood and is therefore surrounded by water. Although the film cassette is pressed against the hood with a certain force, a film of water remains between the film cassette and the hood wall, in particular in the vicinity of corners and peripheral zones of end surfaces of the cassette, which falsifies test results as a result of scattered neutrons. The film cassette contact pressure which is necessary may furthermore result in undesirable permanent deformations. The solid hood wall disposed between the control element and the film cassette increases the distance between the image plane and the control element which, with a divergent collimator, produces an increase in the geometrical lack of sharpness at the image plane and in an increase in the image size. The hood configuration mentioned above furthermore results in an attenuation of the neutron fluxes as a result of neutron absorption and leads to additional neutron scatterings.

It is accordingly an object of the invention to provide an apparatus for the neutron-radiography testing of a boiling water reactor control element, which overcomes the hereinafore-mentioned disadvantages of the heretofore-known devices of this general type and with the aid of which the image quality can be substantially improved.

With the foregoing and other objects in view there is provided, in accordance with the invention, in a boiling water reactor having a control element disposed in a water pond, an apparatus for the neutron-radiography testing of the control element, comprising a film cassette having a recording area or film area, a water-free hood fitting over the control element, the hood having an open bottom and a wall facing or being adjacent the film cassette, the wall having an opening formed therein with a cross section corresponding to the recording area, a holding device fitting over the opening for receiving the film cassette, the holding device having a downwardly open side extended below the opening through which the film cassette is to be introduced into the holding device, a neutron source, and a collimator, the neutron source, the collimator and the film cassette lying in one measurement plane.

The internal space of the hood that is kept free of water by air pressure extends to the holding device. After the film cassette has been introduced into the water-free space from below, the air flowing past the film cassette ensures a water-free film area even before the test position is reached. Due to the opening, the film cassette approaches to the hood wall or a film of water being eliminated.

In accordance with another feature of the invention, the holding device has a skimmer past which the surface of the film cassette adjacent the hood can be fed.

In accordance with a further feature of the invention, there is provided a coupling piece projecting from the film cassette, a coupling rod, and a detachable coupling link interconnecting the coupling piece and the coupling rod.

Through the use of the coupling rod, the film cassette can be readily introduced into the holding device from outside the water pond.

In accordance with a concomitant feature of the invention, the holding device has a guide surface with an upper end, a stop for the film cassette adjoining the upper end, and a locking device holding the film cassette in a test position. This is done in order to achieve a precise positioning of the film cassette.

Other features which are considered as characteristic for the invention are set forth in the appended claims.

Although the invention is illustrated and described herein as embodied in an apparatus for the neutron-radiography testing of a boiling water reactor control element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
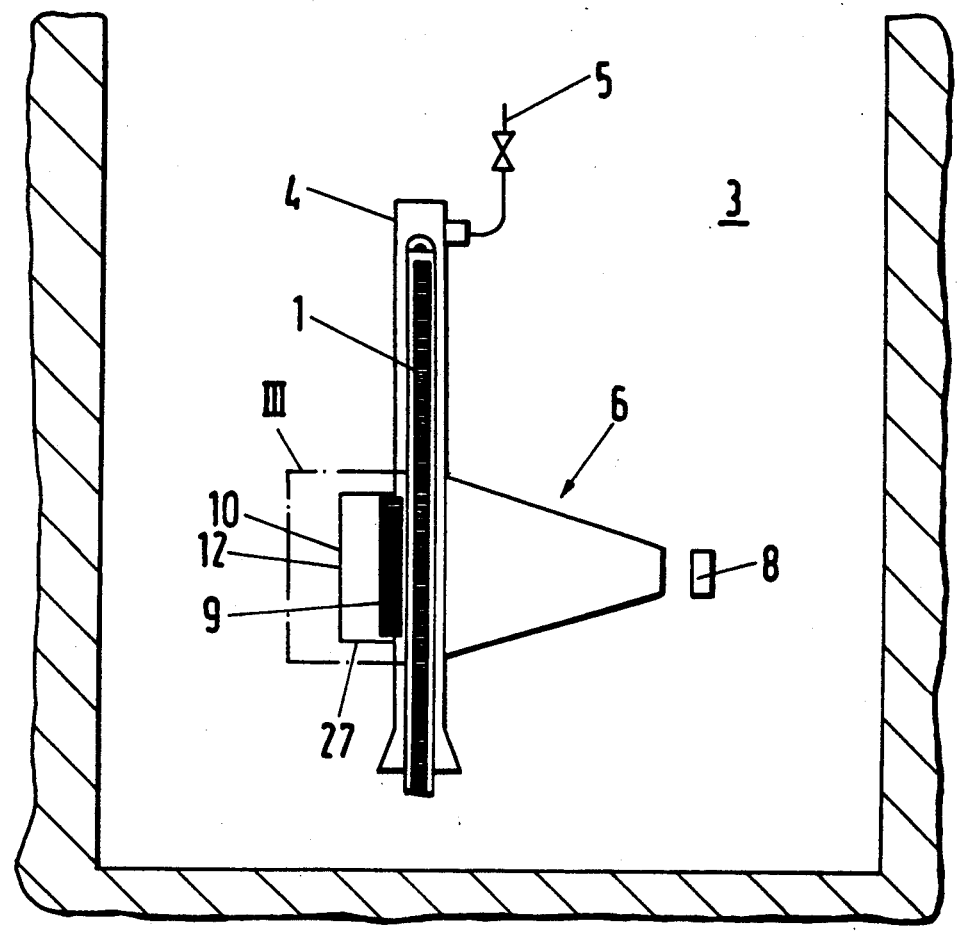
FIG. 1 is a fragmentary, diagrammatic, longitudinal-sectional view of an apparatus according an exemplary embodiment of the invention.
Figure 2:
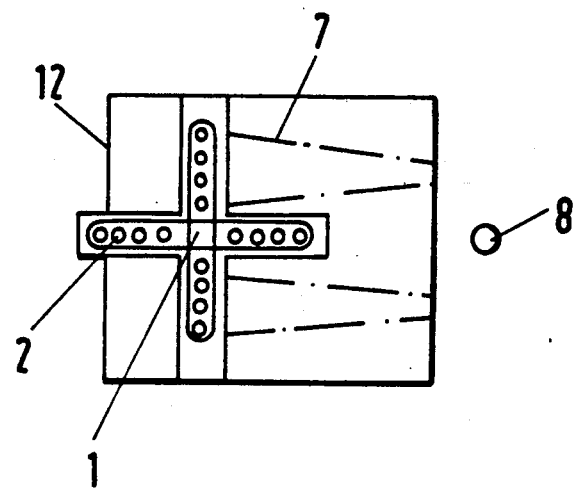
FIG. 2 is a view taken in the direction of an arrow II in FIG. 1.

Referring now to the figures of the drawing in detail and first, particularly, to FIGS. 1 and 2 thereof, there is seen a cross-sectional view of a cross-shaped control element 1 of a boiling water reactor. The control element 1 receives tubes 2 containing absorber material that extend along the longitudinal axis of the control element. The control element, which is disposed in a water pond or pool 3, has a can be brought to various test positions with the aid of a non-illustrated hoist and which is kept free of water by means of a compressed air connection 5.

A collimator system 6 is integrated into the hood 4 in such a way that two vanes of the control element 1 are always exposed to a divergent collimator 7, as shown by phantom lines in FIG. 2. The collimator 7 has an inlet opening with a neutron source 8. In each case, a film cassette 9 which contains an image recorder is situated opposite the collimator 7 in the same measurement plane. The film cassette 9 is disposed in a holding device 10 which has a construction and relationship to the hood 4 that is explained below in connection with FIG. 3.

Figure 3:
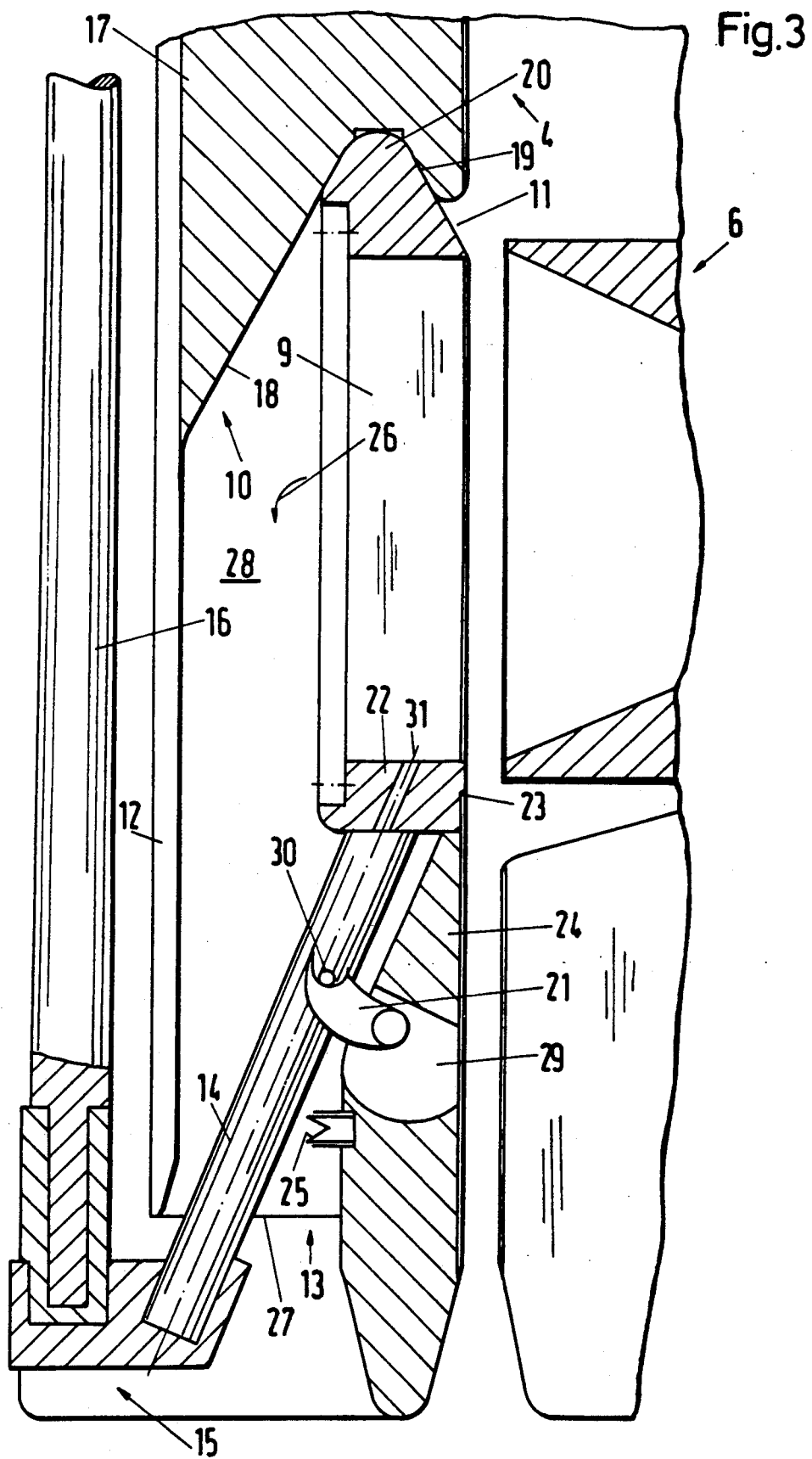
FIG. 3 is an enlarged, fragmentary, longitudinal-sectional view of a portion III in FIG. 1.

As can be seen from FIG. 3 which is on an enlarged scale, the hood 4 has a wall with an opening 11 therein adjacent the film cassette. The opening 11 is disposed in a common measurement plane of the neutron source 8, the collimator system 6 and the film cassette 9 and its cross section corresponds to the cross section of the image recorder used in the film cassette 9. The holding device 10 fits over the opening 11 and is joined to the wall of the hood 4 through a sheet-metal casing 12 in such a way that a housing is produced which only has an opening 27 in its lower surface 13. The sheet-metal casing 12 has side walls 28 extended perpendicular to the wall of the hood 4, with which the sheet-metal casing 12 forms a form-locking guide channel for the film cassette 9. A form-locking connection is one which connects two elements together due to the shape of the elements themselves, as opposed to a force-locking connection, which locks the elements together by force external to the elements. The holding device 10 is consequently in communication with the internal space of the hood 4 through the opening 11 and is a part of the hood which is also kept free of water through the compressed air connection 5. The sheet-metal casing 12 of the holding device 10 is drawn downwards to such an extent that it terminates at about one height measurement of the film cassette below the lower edge of the opening 11.

Projecting from the film cassette 9 is a coupling piece 14 which extends downwards at an angle and which enters into a detachable coupling link 15 with a coupling rod 16 extended approximately parallel to the hood 4. The length of the coupling rod 16 is dimensioned in such a way that it can be moved from outside the water pond 3 by manual actuation. The film cassette can therefore be introduced through the opening 27 into the water-free space of the holding device 10 by remote control. In order to reliably reach the measuring position, the holding device 10 has a centering piece 17 with a guide surface 18 that adjoins a stop 19 for the film cassette 9. The stop 19 has a truncated conical construction and receives an upper part 20 of the film cassette 9, which is likewise constructed with regard to its shape, in such a way as to center it. In the limit position, the film cassette 9 is centered by its lower frame part 22 on a projection 23. The projection 23 is a component of a guide piece 24 which extends below the opening 27. The film cassette 9 is held in the measuring position by at least one locking device 21 which comes out of a recess 29 in the guide piece 24 in such a way as to rest against a stop pin 30 provided on the coupling piece 14 with the aid of a non-illustrated pneumatic cylinder. The guide piece 24 carries a skimmer 25 which is already disposed in the water-free space of the holding device 10 and removes water residues from the surface of the film cassette 9 adjacent the opening 11. The skimmer 25 consequently assists the action of an air current flowing in the direction of an arrow 26, which also contributes to the removal of residual water. In order to ensure that no water can penetrate into the internal space of the cassette during the transport of the film cassette 9 through the water pond 3 to the hood 4, the part of the coupling piece 14 which is of tubular construction has a non-illustrated compressed air connection, so that air can pass through a hole 31 in the cassette 9 into its internal space.

I claim:

1. In a boiling water reactor having a control element disposed in a water pond, an apparatus for the neutron-radiography testing of the control element, comprising a film cassette having a recording area, a water-free hood fitting over the control element, said hood having an open bottom and a wall facing said film cassette, said wall having an opening formed therein with a cross section corresponding to said for receiving said film cassette, said holding device having a downwardly open side extended below said opening through which said film cassette is to be introduced into said holding device, a neutron source, and a collimator, said neutron source, said collimator and said film cassette lying in one measurement plane.

2. The apparatus according to claim 1, wherein said holding device has a skimmer past which a surface of said film cassette adjacent to said hood can be fed.

3. The apparatus according to claim 1, including a coupling piece projecting from said film cassette, a coupling rod, and a detachable coupling link interconnecting said coupling piece and said coupling rod.

4. The apparatus according to claim 1, wherein said holding device has a guide surface with an upper end, a stop for said film cassette adjoining said upper end, and a locking device holding said film cassette in a test position.

* * * * *